(12) United States Patent
Vu et al.

(10) Patent No.: US 6,674,850 B2
(45) Date of Patent: Jan. 6, 2004

(54) CALL PROCESSING DIGIT TRANSLATION AND CHARACTERIZATION

(75) Inventors: Joe Q. Vu, Plano, TX (US); Matthew C. Perry, Plano, TX (US)

(73) Assignee: Santera Systems Inc., Plano, TX (US)

( * ) Notice: Subject to any disclaimer, the term of this patent is extended or adjusted under 35 U.S.C. 154(b) by 557 days.

(21) Appl. No.: 09/757,735

(22) Filed: Jan. 9, 2001

(65) Prior Publication Data

US 2003/0165226 A1 Sep. 4, 2003

(51) Int. Cl.[7] .............................. H04M 3/42; H04M 7/00
(52) U.S. Cl. ............................ 379/220.01; 379/201.01; 379/207.03; 379/207.11; 379/221.06; 379/221.14
(58) Field of Search ...................... 379/201.01, 201.02, 379/201.12, 207.03, 207.11, 219, 220.01, 221.02, 221.06, 221.14

(56) References Cited

U.S. PATENT DOCUMENTS

| | | | | |
|---|---|---|---|---|
| 4,791,665 A | * | 12/1988 | Bogart et al. | 379/221.02 |
| 5,887,058 A | * | 3/1999 | Kammath et al. | 379/284 |
| 5,937,053 A | * | 8/1999 | Lee et al. | 379/221.14 |
| 6,154,533 A | | 11/2000 | Foelker | 379/201.01 |
| 6,215,866 B1 | * | 4/2001 | Salisbury | 379/221.12 |
| 6,324,273 B1 | * | 11/2001 | Alcott | 379/201.03 |
| 6,577,725 B1 | * | 6/2003 | Lee | 379/242 |

FOREIGN PATENT DOCUMENTS

DE    198 04 197 A1    8/1999    ........... G06F/17/30

* cited by examiner

Primary Examiner—Harry S. Hong
(74) Attorney, Agent, or Firm—Wei Wei Jeang; Munsch, Hardt, Kopf & Harr, P.C.

(57) ABSTRACT

An optimal digit translation and call processing system and method is provided. A prefix translation and digit characterization process are performed utilizing a digit prefix table and a second table interfaced therewith. The digit prefix table contains numerous records corresponding to prefixes of dialed digit streams. Each record includes an index to a record of a second table operable to output a termination type of the digit stream. The second table includes numerous records associated with various call termination types. Each index included within respective records of the digit prefix table may reference more than one record of the second table. The digit stream length is analyzed to resolve ambiguities in the digit stream when an index in a record of the digit prefix table references more than one record of the second table. Multiple records of the digit prefix table may have a common index to an identical record of the second table thus reducing the required number of records in the second table for characterizing call termination types. A call screening table is interrogated with termination type data obtained from the second table. The call screening table can pass call control to a national or international translator table which provide a route index on which further call processing is performed. The route index may be modified by an originator routing table, a carrier identification code routing table and a time of day routing table before the call is ultimately routed.

28 Claims, 2 Drawing Sheets

CALL PROCESSING DIGIT TRANSLATION AND CHARACTERIZATION

TECHNICAL FIELD OF THE INVENTION

The invention relates to telecommunication switching systems and, in particular, to a unified access switch digit translation system for providing digit translation and call routing in a telecommunication system.

BACKGROUND OF THE INVENTION

Telecommunication carriers are increasingly deploying multi-service packages, or bundled services, to customers to provide reduced overall access charges in an attempt to increase customer retention. For example, the boom in digital subscriber line subscriptions has led many carriers to bundle high bandwidth Internet service with traditional voice services. The carrier can advantageously charge a higher fee for the bundled service than the individual service fees of any of the services that are bundled together while still offering a bundled service fee less than the sum of typical fees of the individual services thus providing an incentive for customers to subscribe to additional services. Recent market trends indicate an extensive consumer demand for these bundled services. Numerous cable carriers also provide bundled services in the form of traditional pay cable television services bundled with high bandwidth cable Internet access. Deregulation in the telecommunication industry that is now allowing long distance carriers to compete with local carriers promises to bring additional bundled services to the consumer. Wireless services are also being bundled with numerous combinations of the above-mentioned services. Market trends with regard to bundled services are unmistakable. Successful carriers of the future will have the ability to offer various packages of voice and data services. Already, carriers are feeling the strain of successfully upgrading existing infrastructures to meet the high-bandwidth services being demanded by customers. Some local carriers are currently reporting up to three year back logs of orders for DSL services, for example.

Transition networks are commonly utilized to provide customer access to voice and data networks. An access network interfaces with voice and data switches each respectively interfacing with a data network, for example a packet backbone network, and the public switched telephone network. Typically, various classes of voice switches, for example class 4 switches for providing interexchange carrier (IXC) voice services and class 5 switches for providing end office voice services, are required within the transition network. Multiple media gateways are then required to interface with a data access switch. However, work towards a truly integrated voice and data network is underway.

Significant amounts of labor are expended to maintenance and upgrade the transition networks as new services become available. A move to unified access is clearly advantageous and promises to propel emerging technologies that are not easily implemented over current large scale networks, for example voice over IP (VoIP) and voice over DSL (VoDSL), to a broader degree of acceptance.

Unified access will require greatly improved switching systems that are commonly found in the PSTN today. The switching fabric will require various services to be switched to numerous other disparate networks. For example, an inbound time division multiplex message would need to be able to be switched to another time division multiple channel as well as various other networks, for example IP for a terminating VoIP customer. Similarly, the unified switch would need to be capable of switching an IP originating call to an IP, TDM, frame relay and ATM network, to name just a few. Clearly, a switch required to realize unified access will have sophistication not embodied in typical switches found in carrier networks today.

Typically, digit translation performed in telecommunication switching systems is limited in the amount of servicing provided for data networks. A unified access switch would preferably be capable of handling translation for all calls being translated and routed therefrom. Furthermore, in today's switching systems, the lookup tables (referred to hereinafter simply as 'table') generally have records for each termination type capable of being routed from the switch. By integrating data services into a unified access switch, the size of these tables will undoubtedly grow as services, for example screening services, now common with many voice services become deployed for data services.

SUMMARY OF THE INVENTION

In accordance with an embodiment of the present invention, an optimal digit translation and call processing system and method is provided that reduces the size of the tables required for performing digit translation. A prefix translation and digit characterization process are performed utilizing a digit prefix table and a second table interfaced therewith. The digit prefix table contains numerous records corresponding to prefixes of dialed digit streams. Each record includes an index to a record of a second table operable to output a termination type of the digit stream. The second table includes numerous records associated with various call termination types. Each index included within respective records of the digit prefix table may reference more than one record of the second table. The digit stream length is analyzed to resolve ambiguities in the digit stream when an index in a record of the digit prefix table references more than one record of the second table. Multiple records of the digit prefix table may have a common index to an identical record of the second table thus reducing the required number of records in the second table for characterizing call termination types. In accordance with another embodiment of the present invention, a call screening table is interrogated with termination type data obtained from the second table. The call screening table can pass call control to a national or international translator table which provide a route index on which further call processing is performed. The route index may be modified by an originator routing table, a carrier identification code routing table and a time of day routing table before the call is ultimately routed.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Figure 1:
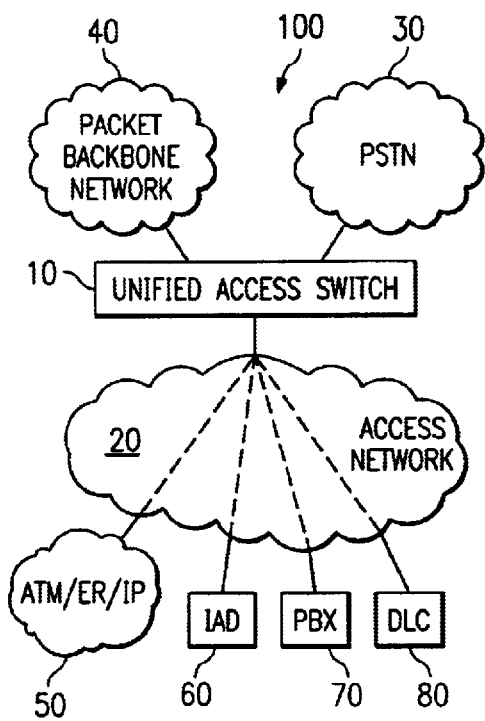
FIG. 1 is a simplified telecommunication system including a unified access switch on which the present invention may be deployed.

In FIG. 1, there is illustrated a simplified telecommunication system 100 including a unified access switch 10 according to the present invention. The unified access switch 10 provides an interface for an access network 20 to, for example, a packet backbone network 40 and the public switched telephone network (PSTN) 30. The access network 20 may interface to various telecommunications equipment, for example asynchronous transmission mode, frame relay, and Internet protocol devices all generally designated by reference numeral 50, as well as an integrated access device (IAD) 60, private branch exchanges (PBXs) 70, and digital loop carriers (DLCs) 80, operating under disparate protocols and transmission techniques. The unified access switch 10 provides interfacing of subscriber lines to switching hardware and software for connection to other subscriber lines and communication facilities.

The unified access switch 10 preferably includes various protocol translation modules that may be embodied in various hardware and software. Pursuant to providing digit translation according to the present invention, various tables are maintained within the unified access switch 10. These tables are preferably stored within memory modules within the unified access switch 10. The tables may contain numerous records each respectively storing various parameters and identifier fields respectively associated with and defining various subscriber services. It should be understood that the term table as used herein is not intended to limit the data contained therein to traditional record-field table formats but may include data stored in various tree structures, for example, for facilitating data searches thereof. A database of subscriber profiles is preferably maintained within the unified access switch 10 and defines various services subscribed to by the subscribers. These services may define appropriate routing procedures for respective call termination types and may be associated with voice as well as data services calls. The subscriber profiles are preferably maintained within read-write memory modules for facilitating modification of the data, that is the subscription services, defined therein. Preferably, each of the subscriber profiles include a prefix tree selector, a translation group, a screening class, a carrier identification and a subscriber group although the information contained within each of the subscriber's profile is not limited thereto.

The call processing digit translator of the present invention includes a dialed digit recognition module, a dialed digit classification module, a call termination screening module and routing module. The digit translator provides digit recognition and interpretation capabilities and, based on the digit recognition and interpretation functions, determines how the call is to be processed, for example routed though the network, denied access, etc. The digit translator is a programmable translator that can be configured to handle various call scenarios in the emerging integrated voice and data services switches. The digit translator is advantageously programmable and accordingly can provide call processing for services currently being offered and future services yet to be deployed.

Digit translation according to the present invention is performed universally on all call originations, regardless of whether these calls are subscriber line originated calls or trunked originations. Furthermore, the translator is adaptable to process call originations irrespective of the protocol, the call features invoked by the call and customer specific data included in the call origination.

The call processing digit translation and call processing of the present invention is performed in three general steps and includes a prefix translation and digit prefix characterization step, a call screening step and a routing step. Each of these steps is carried out by interrogation of various tables maintained within the switch. Generally, the prefix translation step is implemented to recognize pre-designated calling prefixes. When the prefix translation step determines pre-designated calling prefixes exist in the digit stream, the pre-designated prefix is removed from the stream. The called party (destination) number is then recovered from the remaining stream. The final call type, that is the termination type, is then evaluated from the digit stream. Finally, the digit stream is analyzed for ambiguously dialed number combinations.

The call screening step is generally implemented to determine whether the originating (calling) party is allowed to perform the call under the evaluated scenario. A screening class associated with the call originator is retrieved from a subscriber profile maintained on the originating party. Generally, each calling party accessing the switch for originating a call therefrom will have a subscriber profile maintained within the switch describing the originator's subscription services. The originator's profile may include various data relating to call services of the subscriber and includes any call screening functions and special routing services subscribed to by the originator. The termination type, as evaluated in the prefix translation and digit prefix characterization step, is then compared with the screening class to determine if the call is allowed. If the call screening step affirms that the originating party is allowed to place the call, a routing step is implemented for refining the call type analysis and evaluating a route for trunk terminated calls. Screening services for voice and data services may be distinguished by the screening class, for example, or other subscriber data such as the subscriber group.

The call processing digit translator of the present invention is preferably implemented in various computer executable code modules, or application programming interfaces, maintained with the unified access switch 10 of the present invention. Two data tables are accessed by the prefix translation of the present invention.

A digit fence table contains data to characterize the dialed number. The digit fence table includes a fence index field for identifying various records therein. A digit prefix table contains a list of prefixes each having an associated digit fence table index. These two tables are used, in conjunction with one another, to recognize and separate any special prefixes, for example prefixes used for designating an invocation of public features, to determine the called party number. The digit fence table and the digit prefix table are collectively utilized to determine the general nature of the called number and resolve any ambiguously dialed number as well.

A prefix translation module, or prefix translation API, provides initial call screening and digit manipulation by accessing the digit fence table and a profile associated with the calling originator. The dialed digit prefix may be classified according to various defined prefixes, for example a standard prefix such as *, 101, 0, 1, etc., a directory prefix number, an international number, etc. By using two tables to specify the prefix and identify the call type, two distinct advantages are realized. Multiple, identical prefixes entered in the prefix translator table can be mapped to an identical index of the digit fence table. Repetition in the digit fence table is therefore reduced. Furthermore, multiple entries in the digit fence table can be selected with a single index of the digit fence table. Different entries sharing a digit fence index represent different ambiguous numbers that, for example, start with a common prefix. The particular digit fence index used for a call is selected based on the dialed digit length. Thus, various digit fence indices may correspond to a common prefix with each of the records of these different indices corresponding to dialed digits of differing lengths.

Figure 2:
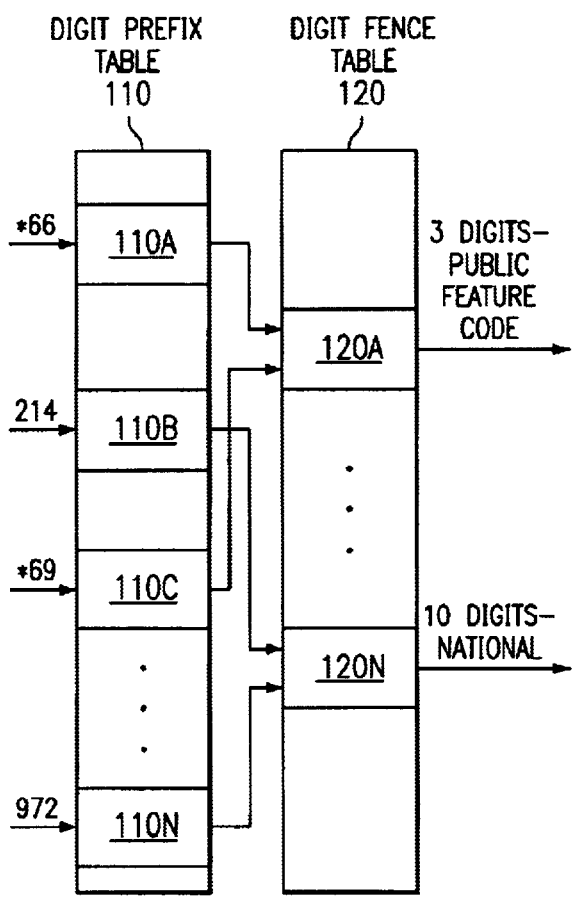
FIG. 2 is a simplified digit prefix table and digit fence table for performing digit prefix characterization including a termination type analysis.

The functional behavior of the digit prefix table, also referred to herein as a prefix tree, as it interacts with the digit fence table may be better understood with reference to FIG. 2. The digit prefix table 110 includes numerous entries, for example prefix entries 110A–110N respectively illustrating the entries for *66, 214, *69 and 972 prefixes, for the various valid prefix entries that may be recovered from an originating phone call digit stream. It is understood that the prefix entries 110A–110N are exemplary only and numerous such prefixes exists. Furthermore, the prefixes included in the digit prefix table 110 are preferably dynamic in number, i.e. the digit prefix table 110 is updateable such that prefixes addressing as yet undeployed services or prefixes addressing yet-to-be defined calling area codes, may be added to the digit prefix table 110 when desired.

An example of multiple prefixes having a common digit fence table index, as mentioned above, is illustrated in FIG. 2. For example, prefixes *66 and *69 having respective digit prefix table 110 entries 110A and 110C share a common digit fence table index and are accordingly mapped to the digit fence table entry 120A that designates a public feature code, that is digit prefix table entries 110A and 110C both include an identical index referencing the digit fence table entry 120A. Furthermore, the digit prefix table entries 110B and 110N respectively associated with prefixes 214 and 972 share a digit fence table index and are thus commonly mapped to entry 120N of the digit fence table 120. Generally, most numbering plan areas (NPAs) can share a common profile and thus a common digit fence table index. Furthermore, each prefix entry of the digit prefix table 110 may be mapped to multiple digit fence table 120 entries. Thus, a single digit fence table index may be used to reference multiple entries of the digit fence table 120. Multiple mappings from a single digit fence table index may be performed by analyzing the digit string length and mapping the index to a digit fence table entry accordingly. Such a procedure may be used to resolve ambiguous digit streams as described more fully below. Providing multiple mappings from a single digit fence table index reduces the number of required entries in the digit prefix table 110 by eliminating the need for separate entries in the digit prefix table 110 for identical prefixes having different termination types, for example national and international termination types having a common prefix.

As a further aspect of the present invention, the digit prefix table 110 and the digit fence table 120 may be conjunctively used to resolve ambiguously dialed numbers, for example numbers having a common NPA and central office number (NXX). That is, in a dialed number having the form NPA-NXX-XXXX where NXX designates the specific telephone company central office, an ambiguity results when the NPA and NXX are identical. In the present invention, ambiguously dialed digits are resolved by exploiting the ability of assigning multiple digit fence entries to a common digit fence index. For example, consider a case where the NPA and NXX digits are both 972. A dialed digit stream having an NPA of 972 would take the form of 972-NXX-XXXX. A dialed digit stream having an NXX of 972 would be of the form 972-NXXX. Both numbers can be recognized by the common prefix, in this case 972. However, for proper call routing, different results should occur depending on the dialed digit string length. Two entries are made in the digit fence table each sharing a common index to resolve the ambiguity. A first entry, corresponding to the dialed digit stream having an NPA of 972, would classify the dialed digit stream as national (10 digit dialed digit stream) thus requiring no digit stream modification. A second entry, corresponding to the dialed digit stream having an NXX of 972 (7 digit dialed digit stream), would classify the number as national along with a need to prefix the NPA on the digit stream. The prefix translator table 110 is used to produce the digit fence index when the 972 prefix is recognized. The index is then checked against the digit fence table 120 to find the two entries. The actual number of digits dialed is used to determine which profile is used. Other NXX combinations having an equivalent NPA sequence of numbers are resolved in a similar manner.

Digit prefix characterization generally proceeds to one of a number of defined results. In general, the prefix is characterized as a public feature code, a national or international prefix, 911, operator assistance, or a special number, for example a service area code (SAC) such as personal communication services (PCS), toll services and premium services. Additional prefix characterizations include user-specified cause values that result in user-defined call treatments, for example an assigned tone, a user-defined announcement or an intercept route. A system-defined cause value results when a failure to match the digit prefix occurs. The translation process terminates if a cause value is assigned.

Figure 3:
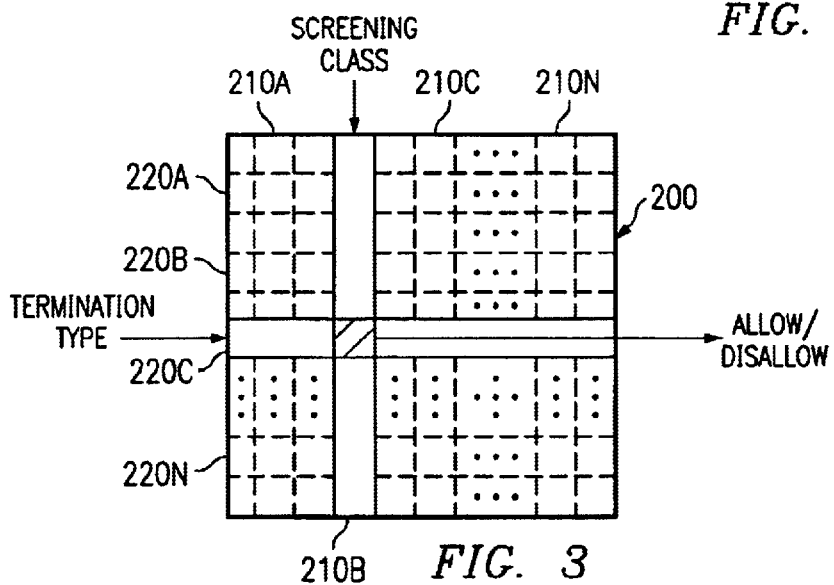
FIG. 3 is a simplified screening table according to an embodiment of the present invention.
Figure 4:
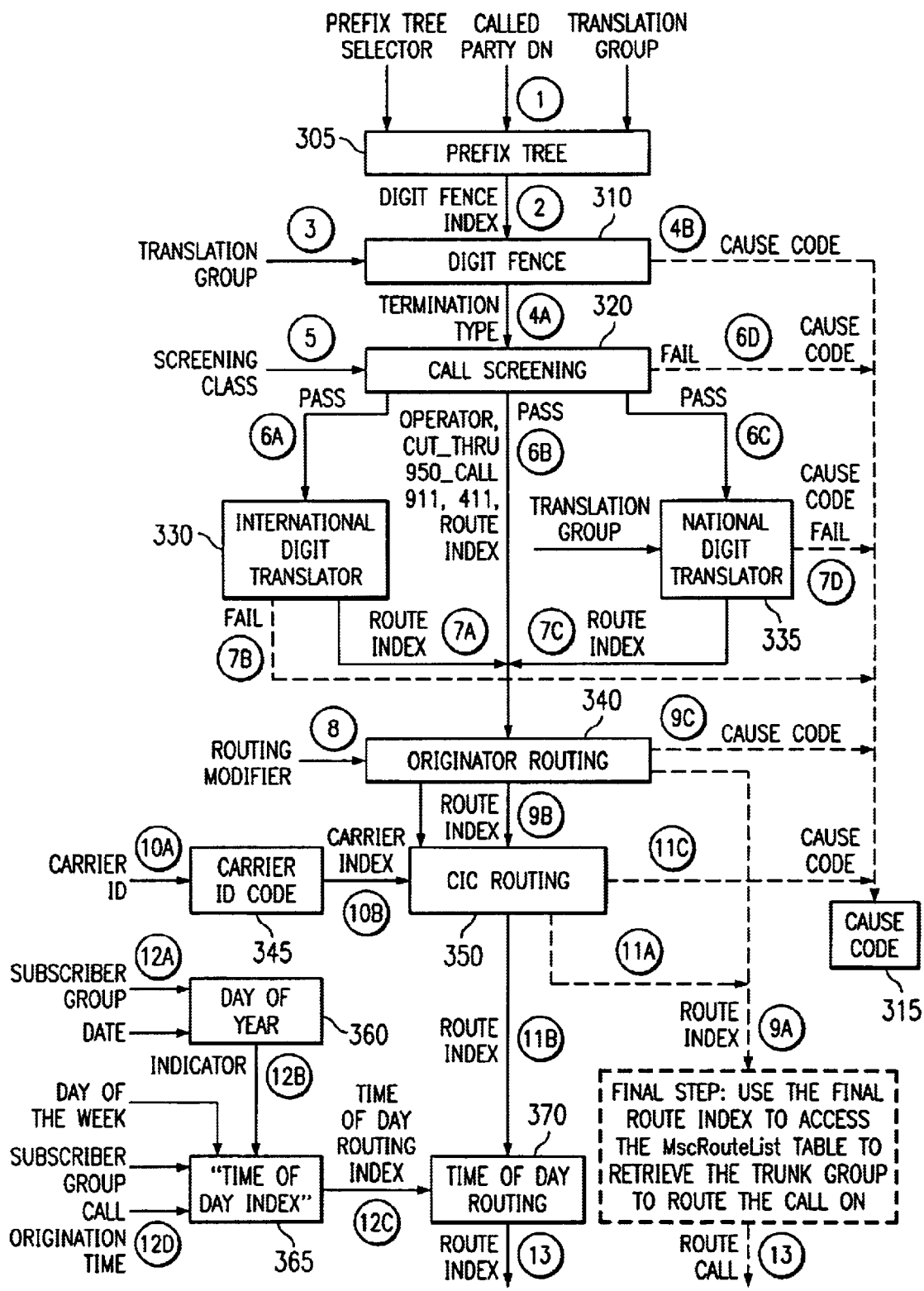
FIG. 4 is a flowchart of the prefix translation and digit characterization process of the present invention including call screening and routing processes thereof.

The unified access switch 10 of the present invention preferably utilizes a separate table for performing call screening. With reference to FIG. 3, there is illustrated an embodiment of a screening table 200 preferably maintained within the unified access switch 10 of the present invention. The screening table 200 is utilized to verify that the originating calling party is allowed to perform the type of call being placed. A screening class 210B stored within the originator's profile is compared with a termination type 220C assigned by the digit fence table 120. Results of the comparison between the screening class and the termination type indicate call allowance or disallowance. Numerous combinations of call types can be disallowed by the screening class table 200 based on the various termination types that can be assigned by the service provider. Consequently, numerous screening classes 210A–210N may be defined to exploit the variety of termination types 220A–220N, for example national termination types, international termination types, and SAC termination types, defined by the service provider.

Comparisons may also be made during call screening to determine if the dialed digits are valid pursuant to prohibiting call processing and routing that would be wasted processing resources on an invalid terminating number. Interrogations may also be performed to determine if the calling originator is pre-subscribed to the carrier when carrier specified dialing is performed. In the event that the originator is not pre-subscribed with the carrier, call processing may then proceed according to the carrier's specified treatment of non-subscribed parties. Additionally, the presence or absence of a toll prefix, for example 1+(NPA NXX XXXX), may be evaluated against the originator's profile to determine if toll calls are allowed from the originating party. Two commonly implemented screening classes may include toll blocking, for example blocking 1+NPA NXX XXXX dialed number in order to prevent long distance charges from the originator, and premium call blocking, for example NPAs of 900 and 976 that result in fees not associated with long distance or carrier charges. By enabling a 1+ call blocking in the originating party's profile, the call is disallowed if a 1+ prefix is isolated during prefix translation. Likewise, the call is disallowed if a premium blocking record in the originator's profile is maintained and an SAC premium prefix is isolated during prefix translation. In the event that a call is screened, a user-defined cause value specific to the call disallowance may specify appropriate call treatment, for example generation of a tone or an announcement that is played to the calling originator.

A national digit translation table is preferably utilized by the unified access switch 10 of the present invention. National numbers dialed by an originating party are compared with entries of a national digit translation table to determine a corresponding entry therein. Numbers compared with entries of the national digit translation table should be unambiguous as a result of prefix translation as described hereinabove with reference to FIG. 2. Entries in the national digit translation table can be any length of digits. However, digit lengths preferably include the NPA and NXX digits, or more, to allow for office code validation and an analysis of the local number portability. Failure to recover a matching national digit entry in the national digit translation table results in a call failure treatment. Successful recovery of an entry from the national digit translation table produces an index utilized for performing call routing in conjunction with an origination based routing table described more fully hereinbelow.

A country code table is preferably utilized by the unified access switch 10 of the present invention to provide international digit translation. The digits following the international prefix are verified by interrogation of the country code table. Failure to recover a valid country code from the country code table results in generation of a cause code that directs the unified access switch 10 to perform a call failure process. If a country code is successfully recovered from the country code table, the remaining digit length is compared against the identified country's dialing plan. If an appropriate entry fails to be recovered for the identified country's dialing plan, a cause code directing the switch to process the call as a call failure is produced. If both the country code and the remaining digits of the dialed number are successfully matched with respective entries in the country code table, an initial routing index is returned that is used in conjunction with an origination-based routing table as described more fully hereinbelow.

An origination-based routing table is preferably utilized by the unified access switch 10 of the present invention to provide an updated route index based on an origination routing modifier obtained from the originator's profile. The origination routing modifier obtained from the originator's profile is compared with an initial route index to further refine the digit classification (digit type). The comparison results in an updated route index. Refinement of the digit classification is performed on all digits that have been classified in the prefix translation as national numbers. These numbers are refined to provide local subscriber numbers, intra-local access and transport area (intraLATA) and inter-local access and transport area (interLATA) numbers. Route action types are included in the origination-based routing table and provide an indication of whether carrier routing is to be performed. For example, a route action type of 'route immediate' will cause a carrier routing step to be bypassed. Carrier routing may be invoked by a route action type of 'route by carrier'. A route action type of 'treatment' may result for alternative routings, for example failed call treatment or subscriber specified routings.

A carrier identification (CIC) table, as well as CIC routing table, are conjunctively utilized to provide appropriate routing of the call. A carrier ID code assigned to the call is utilized to control routing of the call. The carrier ID code may be included within the subscriber's profile or may be included within the call setup by the unified access switch 10. The particular carrier ID code assigned to the originator defaults to either one of two primary interexchange carriers (PICs). The digit type of the call, as determined from the origination-based routing table, determines which of the PICs is to be utilized. The default PIC may be overridden by, for example, including an originator specified carrier in the original call setup message or connection admission control message. Additionally, the digit fence table 120 may include data indicting an originator specified carrier to provide an override of the default PIC.

A carrier ID code is indexed in the CIC table to provide a carrier index for the call. The carrier index and the route index, as obtained from the origination-based routing table, are input into the CIC routing table. Results from the CIC routing table may include various types of routing to be performed including immediate routing, time of day routing, and call treatment scenarios. Output from the CIC routing table may also include an indication that no routing is to be performed.

Time of day routing, as may be invoked by the CIC routing table, is performed by utilization of a day of year table, a time of day index table and a time of day routing table. The carrier route index is updated when time of day routing is invoked by use of a time of day index in conjunction with the route index. The time of day routing index is generated from the time of day index table. The time of day index table produces the time of day routing index in response to an interrogation of an indicator provided by the day of year table and the subscriber group data from the originator's profile. The day of year table uses the subscriber group ID to identify any subscriber designated days that result in a specified call treatment. The time of day index table uses the subscriber group ID, as well as the call origination time and the day of the week, to determine a time of day index. Modification of the route index as performed by the time of day routing table can result in modified call routing treatment based upon the time of the particular day the call is placed. This call treatment can be useful, for example, for a business to have calls blocked during certain hours of specific days such as after business hours or weekends.

The final route index is used to obtain a list of trunk groups from a route list table. The list of trunk groups are searched to obtain a trunk group on which to terminate the call. The operation of the unified access switch 10 to provide a route index according to the present invention may better be understood with reference to FIG. 4. The called party directory number (DN) is input into a prefix tree 305 (step 1). Preferably, the prefix tree 305 includes numerous 'branches' each separately addressable for performing interrogations thereof thus providing different call treatment scenarios for identically dialed digit streams. A prefix tree selector (PTS) and a translation group are also supplied to the prefix tree 305. The prefix tree selector is retrieved from the originator's profile and defines the particular branch of the prefix tree 305 that is to be searched. The translation group (TG), also stored within the subscriber's profile, input into the prefix tree 305 is utilized in conjunction with the prefix tree selector to allow for provision of various dialing plans.

As discussed above, the digit prefix table 110 contains indices associated with the digit fence table 120. An index of the digit fence table 310 is referenced by the digit prefix table 110 based upon the recovered prefix, as aforedescribed, to access an associated entry within the digit fence table 310 (step 2). The particular entry referenced may depend, in addition to the particular prefix recovered, upon the prefix tree selector and the translation group input to the prefix tree and considered during interrogation of the digit fence table (step 3). Each entry of the digit fence table 310 may specify different call behaviors dependent on the translation group. Accordingly, the entry of the digit fence table 310 referenced by the digit fence index may have multiple termination types, one of which is chosen for the particular call dependent on the particular translation group specified in the originator's profile. The termination type is input into the call screening table 320 (step 4A) unless an appropriate entry in the digit fence table 310 is not recovered. Failure to determine an appropriate digit fence table 310 entry results in generation of a cause code that is input into a cause code module 315 for appropriate handling of a failed call (step 4B).

The call screening table 320 receives the screening class (step 5) as obtained from the originator's profile in conjunction with the termination type evaluated at the digit fence table 310 to determine whether the call is allowed or disallowed. Disallowance of the call by the call screening table results in generation of a FAIL cause code being reported to the cause code module 315 (step 6D). If the results from the call screening table indicate the call is allowed, process control may pass to the international digit translation table 330, the national digit translation table 335 or may be immediately passed to the origination-based routing table 340.

Results from the digit fence table analysis indicating the call is an international termination type cause process control to be passed to the international digit translation table 330 when the call screening table 320 analysis evaluates the call as allowable (step 6A). Upon validation of the country code and the country's dialing plan an initial route index is passed to the originator routing table 340 (step 7A). Call failure at the international digit translator table 330 may result from failure to recover the country code or failure to confirm the country's dialing plan, for example the remaining digits after the international prefix have a digit length different than digit lengths required by the identified country's dialing plan. Call failure results in generation of a cause code and subsequent passing of the cause code and process handling to the cause code module 315 (step 7B).

Results from the digit fence table analysis indicating the call is a national termination type cause process control to be passed to the national digit translation table 335 when the call screening table 320 analysis evaluates the call as allowable (step 6C). National numbers passed to the national digit translation table 335 have previously had any ambiguities resolved as discussed hereinabove. The national digit translation table may be queried to match any portion of the national number. However, matching the national number's NPA as well as NXX portions provides validation of the office code as well as local number portability confirmation and is accordingly preferable. Successful interrogation of the national digit translation table 335 results in an initial route index, as well as process control, being passed to the originator routing table 340 (step 7C). Failure to identify a valid national number entry in the national digit translation table 335 results in a cause code being generated and passed to the cause code module 315 where call processing control of the failed call is completed (step 7D).

Specially designated types of calls may be immediately passed from the call screening functions performed by the call screening table 320 to the originator routing table 340 without additional digit translation and, preferably, with minimum delay. For example, emergency calls such as 911 and operator assistance calls such as 411 as well as operator cut through calls and SAC calls may be passed directly, along with a route index, to the originator routing table 340 (step 6B).

The routing modifier, as maintained with the originator's profile, is input to the originator routing table 340 so that the digit classification may be further refined (step 8). Refinement of the digit classification is performed on all national numbers to indicate proper classification of the destination number, for example to provide an indication that the DN is a local subscriber, an interLATA or an intraLATA subscriber. Results of the analysis of the originator routing table 340 also indicate whether carrier routing is to be performed. If the call is to be immediately routed, carrier routing is bypassed and the route index is passed to the switching center route list (step 9A) where the appropriate trunk group is identified and the call is routed thereon (step 13). Call processing failure at the originator routing table 340 results in a cause code being generated and passed to the cause code module 315 where processing of the failed call is resumed (step 9C).

In the event carrier routing is to be performed, the route index, possibly modified from the originator routing table 340, is passed to the CIC routing table 350 where call processing control is resumed (step 9B). The CIC table 345 is queried for a carrier index. The CIC table 345 receives a carrier code, for example one of the originator's PICs in a default scenario as described hereinabove (step 10A). A carrier index is then passed to the CIC routing table 350 from the CIC table 345 (step 10B). The CIC routing table 350 utilizes the carrier index and the route index to determine appropriate call processing. Dependent upon the input to the CIC routing table 350, the call may be immediately routed (step 11A), call processing may be passed to the time of day routing table 370 which receives the route index from the CIC routing table 350 (step 11B), or a cause code may be generated and passed to the cause code module 315 (step 11C). If time of day routing processing is bypassed, that is the call is immediately routed from the CIC routing table, the route index is utilized to access the switch route list table to retrieve the trunk group on which the call is to be routed.

When time of day routing is performed, the time of day routing table 370 receives the route index as input from the CIC routing table 350 and a time of day index received from the time of day index table 365 (step 12C) to perform a final update on the route index. The time of day routing index passed to the time of day routing table 370 is produced by the time of day index table 365 in response to an indicator input thereto by the day of year table 360 (step 12B) along with subscriber group information obtained from the subscriber's profile and call origination time and day of week input. The day of year table 360 receives subscriber group profile information (step 12A) along with the originating date of the call to query the user's profile for any special data/time call processing the originator has subscribed to. Results of the analysis by the day of year table 360 provide the input to the time of day index 365 which in turn provides the time of day index to the time of day routing table 370. Results of the time of day routing table 370 provide a final route index to a route list table where a trunk group is identified on which the call is ultimately terminated (step 13).

Thus, it may be seen from the foregoing that a translation system in a telecommunication switch that reduces the size of the tables required for translation is provided. Multiple records of the digit prefix table of the translation system can have a common index to an identical record of a digit fence table that provides a call termination type analysis. A reduction in the number of records in the digit fence table, as well as the overall translation system size, is had.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A switching system for receiving a digit stream of a call transmitted by a subscriber and operable to provide digit recognition of the digit stream, said switching system comprising:
   a first table including a plurality of records respectively associated with a prefix of the digit stream, each record including an index to a second table; and
   the second table including a second plurality of records each respectively associated with a call termination type, at least one of the records of the second table capable of being referenced by a plurality of the indices of the first table, at least one index in the first table operable to reference a plurality of records in the second table, the switching system interrogating the first table using the received digit stream and obtaining an index of a record from the second table therefrom, the switching system selecting a record from the second table associated with the obtained index and processing the call in response to the selected record.

2. The switching system according to claim 1, wherein the plurality of records of the first table includes at least two subsets of records, the interrogation of the first table being limited to one of the subsets by a parameter included within a subscriber profile associated with the subscriber.

3. The switching system according to claim 2, wherein the interrogated subset limits the records of the first table to those supported by a service plan subscribed to by an originating caller that transmitted the digit stream.

4. The switching system according to claim 1, wherein the selected record is dependent on the length of the digit stream when the obtained index references a plurality of records of the second table.

5. The switching system according to claim 2, further comprising a call screening table that includes a plurality of records each defining barred termination types of a screening class, the switching system interrogating the call screening table with an input including the termination type associated with the selected record and a screening class parameter included in the subscriber profile, the switching system disallowing routing of the call if the termination type is barred in the screening class referenced by the screening class parameter.

6. The switching system according to claim 5, wherein the interrogation of the screening class is bypassed when the termination type associated with the selected record is an immediate routing termination type, the call screening table providing an output route index in response to receiving an input from the switching system indicating the termination type associated with the selected record is an immediate termination type.

7. The switching system according to claim 6, further comprising:
   a national digit translator table including a plurality or records each respectively associated with a national termination type call, the switching system interrogating the national digit translator table with a subset of digits of the digit string when the termination type associated with the selected record is a national termination type, the national digit translator table providing an output route index in response to the interrogation thereof; and
   an international digit translator table including a plurality of records each associated with an international termination type call, the switching system interrogating the national digit translator table with a subset of digits of the digit string when the termination type associated when the selected record is an international termination type, the international digit translator table providing an output route index in response to the interrogation thereof.

8. The switching system according to claim 7, wherein the subset of digits includes the digits of the digit stream identifying the numbering plan area.

9. The switching system according to claim 7, wherein the subset of digits includes the digits of the digit stream identifying the central office number.

10. The switching system according to claim 7, further comprising an origination routing table including a plurality of records, the switching system interrogating the origination routing table with the output route index and a routing modifier retrieved from the subscriber profile, the origination routing table modifying the route index and the termination type associated with the selected record to provide a respective refined route index and updated termination type, the origination routing table providing a route action in response to the interrogation thereof, the switching system subsequently performing further processing on the call according to the route action.

11. The switching system according to claim 10, wherein the route action specifies a call failure, the switching system alerting the subscriber of the route action.

12. The switching system according to claim 10, wherein the route action specifies that the call is to be immediately routed, the switching system interrogating a route list with the output route index and routing the call according to a trunk group retrieved from the route list.

13. The switching system according to claim 10, wherein the updated termination type defines the digit stream as one of a local call, an intra-local access and transport area call and an inter-local access and transport area call.

14. The switching system according to claim 10, further comprising:
   a carrier identification code routing table including a plurality of records therein, the switching system providing the refined route index to the carrier identification code routing table; and
   a carrier identification table including a plurality of records therein, the switching system retrieving a carrier identification from the subscriber's profile and inputting the carrier identification into the carrier identification table, the carrier identification table outputting a carrier index in response thereto, the carrier identification code routing table providing a route action after receiving the refined route index and the carrier index, the switching system processing the call in response to the route action provided by the carrier identification code routing table.

15. The switching system according to claim 14, wherein the route action provided by the carrier identification code routing table directs the switching system to immediately route the call.

16. The switching system according to claim 14, wherein the route action provided by the carrier identification code routing table directs the switching system to process the call as a failed call.

17. The switching system according to claim 14, wherein the route action provided by the carrier identification code routing table directs the switching system to perform routing based on the time of day the call is placed, the carrier identification code routing table outputting the refined route index.

18. The switching system according to claim 17, further comprising:

- a day of year table having a plurality of records therein, the switching system interrogating the day of year table with the day the call is placed and a subscriber group identification retrieved from the subscriber's profile, the day of year table outputting a day of year indicator; and
- a time of day index table having a plurality of records therein, the switching system interrogating the time of day index table with the day of year indicator and the subscriber group identification, the time of day index outputting a time of day index in response to the interrogation of the time of day index table;
- a time of day routing table having a plurality of records therein, the switching system interrogating the time of day routing table with the time of day index and the refined route index, the time of day routing table outputting a finalized route index, the switching system processing the call according to the finalized route index.

19. A method of providing digit translation and call routing in a telecommunication switching system comprising:

obtaining a prefix of a digit stream of a called number;

interrogating a digit prefix table with the prefix;

retrieving a first record from the digit prefix table in response to the interrogation, the first record including an index to a second record of a second table;

referencing the second record according to the index; and outputting, by the second table, a termination type associated with the digit stream.

20. The method according to claim 19, wherein the index references a plurality of records of the second table.

21. The method according to claim 19, wherein at least two records of the first table have respective indices referencing a common record of the second table.

22. The method according to claim 19, further comprising the steps of:

interrogating a call screening table with the termination type and a screening class obtained from a profile of the subscriber originating the call; and processing the call in response to the interrogation of the call screening table.

23. The method according to claim 22, wherein the step of processing further comprises allowing the call to be routed if the termination type is not barred in the screening class.

24. The method according to claim 22, wherein the step of processing further comprises disallowing the call if the termination type is barred in the screening class.

25. The method according to claim 23, further comprising the steps of:

interrogating a digit translator table with a subset of the digit stream; and outputting a route index, by the digit translator table, for routing the call thereby.

26. The method according to claim 25 further comprising:

interrogating a routing table with the route index and a routing modifier obtained from the subscriber's profile; and outputting, by the routing table, a modified route index.

27. The method according to claim 26, further comprising the steps of:

interrogating a carrier identification code routing table with the modified route index and a carrier index;

outputting, by the carrier identification code routing table, a newly modified route index indicating routing instructions according to the subscriber's carrier as identified by the carrier index.

28. The method according to claim 27, further comprising the steps of:

interrogating a time of day routing table with the newly modified route index and a time of day index; and outputting, by the time of day routing table, a final route index.

* * * * *